United States Patent

[11] 3,590,925

| [72] | Inventors | Arthur L. Troutner<br>Boise, Idaho;<br>Don Lebell, Santiago, Chile; William A. Koelsch, San Jose, Calif. |
|---|---|---|
| [21] | Appl. No. | 728,857 |
| [22] | Filed | May 6, 1968 |
| [45] | Patented | July 6, 1971 |
| [73] | Assignee | Tara Corporation |

[54] AUTOMATED AGRICULTURAL SYSTEM
3 Claims, 10 Drawing Figs.

[52] U.S. Cl. ................................................. 172/6,
  209/111.7
[51] Int. Cl. .................................................. A01b 63/110
[50] Field of Search ........................................... 172/5, 6;
  356/113; 324/77 H; 209/111.7, 111.5, 111.6

[56] References Cited
UNITED STATES PATENTS

| 3,206,022 | 9/1965 | Roberts et al. | 109/111.6 X |
| 3,305,089 | 2/1967 | Fraenkel | 209/111.5 |
| 3,373,870 | 3/1968 | Black et al. | 209/111.6 |
| 2,400,562 | 5/1946 | Marihart | 172/6 |
| 2,438,224 | 3/1948 | Marihart | 172/6 |
| 2,660,915 | 12/1953 | Zobel | 356/113 X |
| 2,894,178 | 7/1959 | Chesebrough et al. | 172/6 X |
| 3,027,950 | 4/1962 | Cascarine | 172/5 |
| 3,134,840 | 5/1964 | Gamo | 356/113 |
| 3,331,955 | 7/1967 | Norsworthy | 324/77 (H) |
| 3,344,349 | 9/1967 | Schroeder | 324/77 (H) |
| 3,411,625 | 11/1968 | Calhoun | 209/111.7 |

*Primary Examiner*—Robert E. Bagwill
*Assistant Examiner*—Alan E. Kopecki
*Attorney*—Nilsson, Robbins, Wills & Berliner ABSTRACT: The present invention relates to an automated agricultural system for variously servicing the plants of a row crop and particularly to such a system for scanning rows of the crop to accomplish such services as thinning, weeding, blocking, fertilizing, and so on. The system selectively identifies row plants that are to be preserved, a system for processing radiation that is reflected from such plants. The system, as disclosed, also includes specific structure for thinning row plants, spaced apart by a preselected distance.

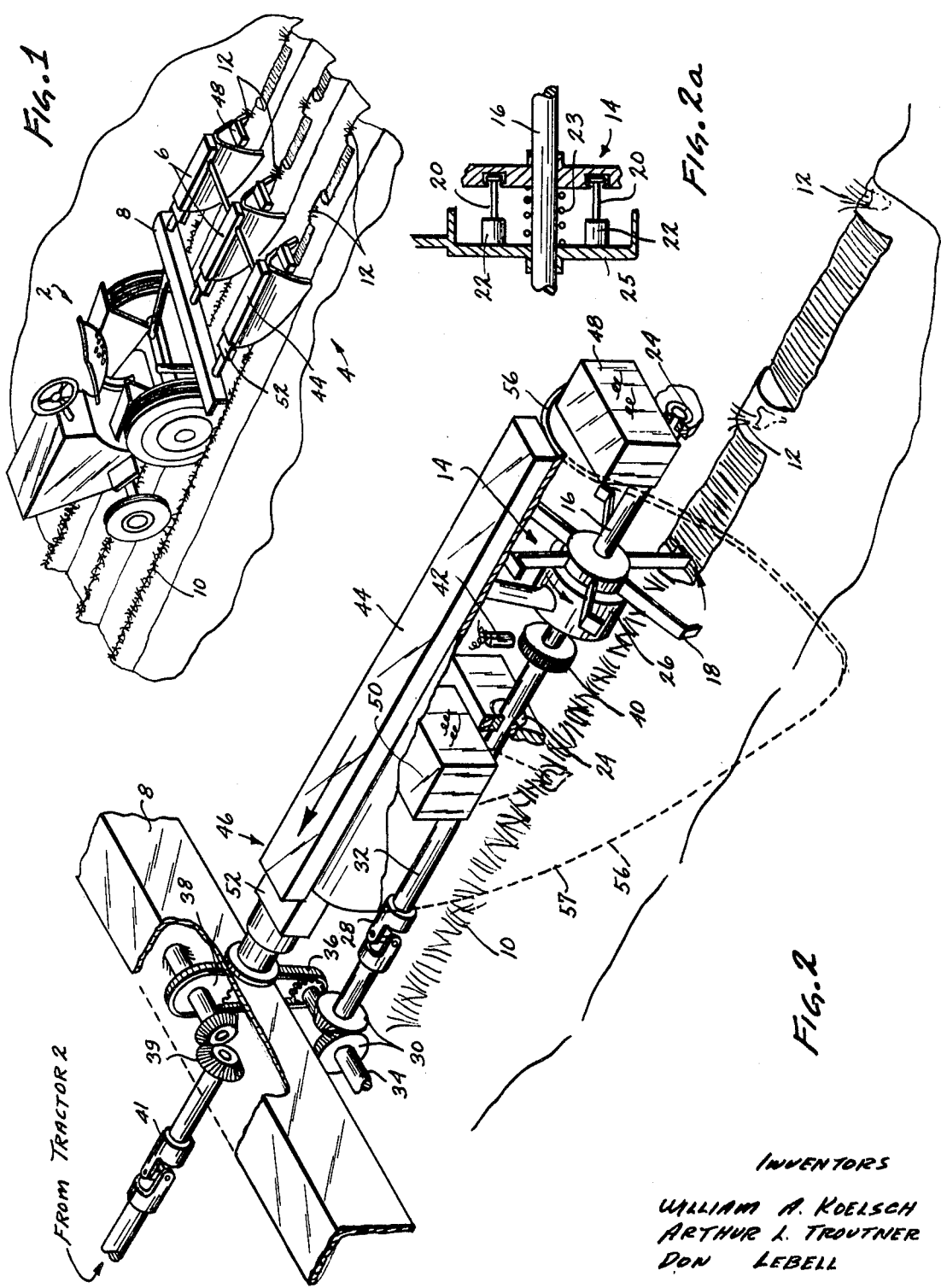

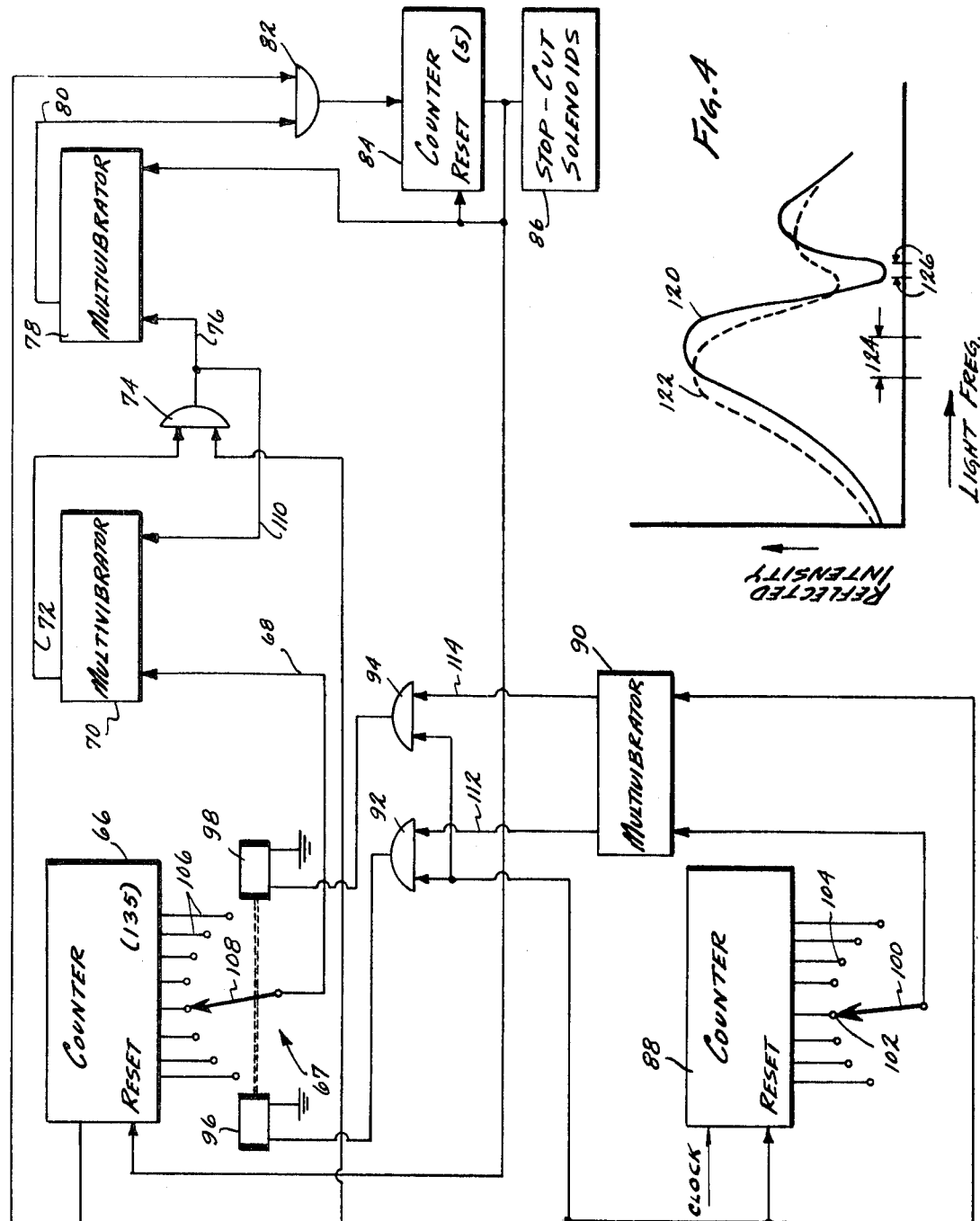

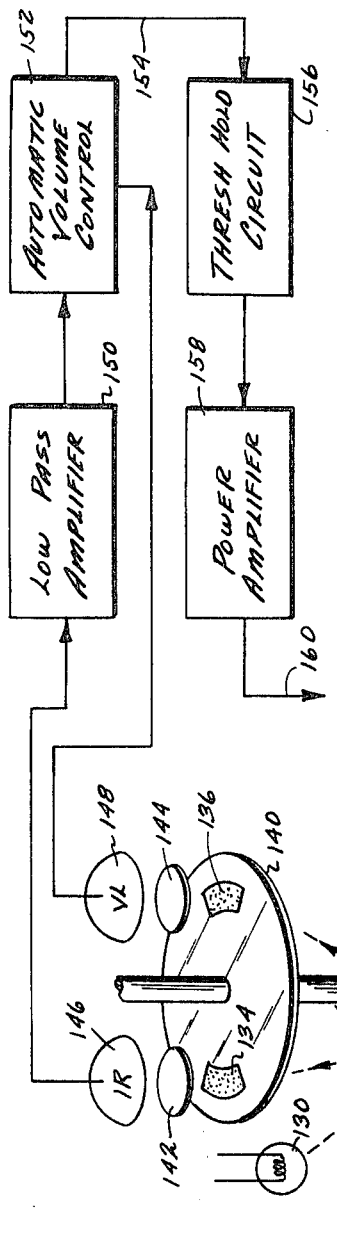
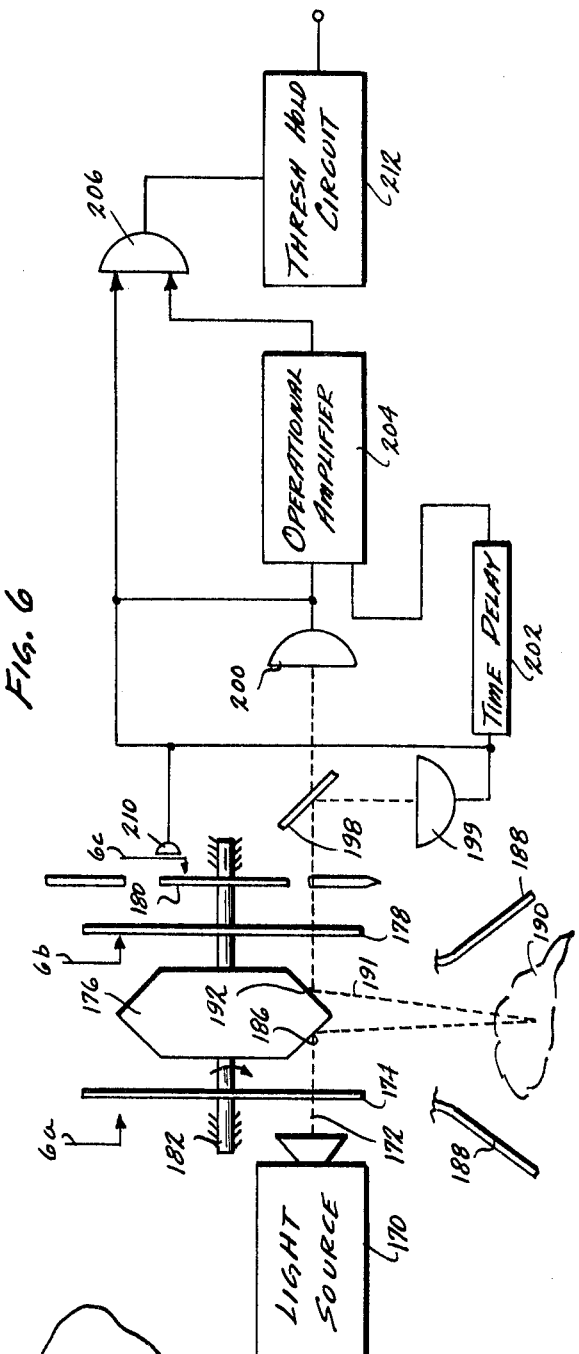
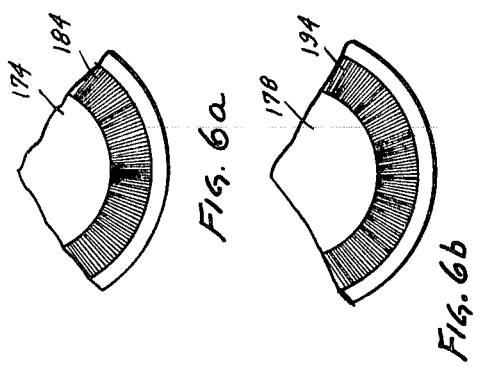

AUTOMATED AGRICULTURAL SYSTEM

BACKGROUND AND SUMMARY OF THE INVENTION

Traditionally, certain agricultural crops have been grown in aligned rows of individual plants that require services as they grow and develop. As one example, sugar beets are conventionally planted in close proximity along a row, then early in the development of the crop, many of the plants are destroyed to provide growing space in which selected spaced-apart plants can properly mature. This technique of overplanting and thinning is employed to avoid relying upon seeds that may fail to germinate or which may produce inferior plants.

Although overplanting has been practiced for many years, recently the technique has become increasingly expensive in view of the increased cost of labor required to thin or block the plants. The need for economy in this operation has been emphasized by other increased operating costs, as weeding and fertilizing. Therefore, a need exists for a system that is capable of servicing plants in situ on a somewhat individual basis which is relatively fast, reliable and effective in operation.

In addition to various services for crop plants, which traditionally have been performed manually, a need has developed for still other plant services. As one example of such services, advanced agricultural chemistry has produced new compounds which are desirably applied in a definite spaced relationship to individual plants. Concentrated fertilizers for example, may be economically and effectively applied exclusively to the area contiguous an individual plant. As a result, a need exists for a system that is capable of providing such service to plants on a substantially individual basis.

It is therefore an object of the present invention to provide an improved system for individually servicing agricultural plants which system includes a mobile structure to scan the plants comprising sensing means for detecting the presence of an individual plant at a predetermined location in relation to the mobile structure; actuator means for servicing the individual plant and control means for operating the actuator means in accordance with a signal from the sensing means.

Another object of the present invention is to provide an improved system for servicing the individual plants of an agricultural crop, which system incorporates sensing means for more positively identifying and indicating the location of individual plants.

Another object of the present invention is to provide a system for destroying plant life between particular plants that are automatically selected for maturity as in thinning and weeding operations, which system controls the space provided between the selected plants somewhat in accordance with the existing plants.

Still another object of the present invention is to provide an effective system for servicing plants, which includes a sensor for more positively identifying the plants which are to be serviced, and thereafter confirming the presence of the serviced plant.

One further object of the present invention is to provide an improved system for servicing plants that are in a row crop, which system may function to scan the row crops whereby to identify individual row crop plants for maturity, destroy other plants and confirm the presence of the selected plants.

One last-mentioned object of the present invention is to provide an improved system for identifying selected plants by utilizing radiation emanating therefrom.

BRIEF DESCRIPTION OF THE DRAWING

These and other objects and advantages of the present invention will become apparent to those skilled in the art from a consideration of the following, taken in conjunction with the appended drawings, in which:

FIG. 1 is a perspective view of an exemplary apparatus constructed in accordance with the present invention, shown attached to a tractor for use in a field;

FIG. 2 is a diagrammatic and somewhat perspective mechanical representation of a component system constructed in accordance with the present invention, as incorporated in the apparatus of FIG. 1;

FIG. 2a is a fragmentary sectional view through a portion of the structure of FIG. 2;

FIG. 2 is a diagrammatic representation of one electrical structure incorporated in the system of FIG. 2;

FIG. 4 is a plot of light frequency versus reflected intensity illustrative of the operation of one aspect of the system as disclosed herein;

FIG. 5 is a diagrammatic representation of another electrical structure incorporated in the system of FIG. 2;

FIG. 6 is a diagrammatic representation of an alternate electrical structure for the system as disclosed herein;

FIG. 6a is a fragmentary sectional view along line 6a of FIG. 6;

FIG. 6b is a fragmentary sectional view along line 6b of FIG. 6; and

FIG. 6c is a fragmentary sectional view along line 6c of FIG. 6.

DESCRIPTION OF THE ILLUSTRATIVE EMBODIMENT

Referring initially to FIG. 1, there is shown a tractor 2 rigidly coupled to an operating structure 4 which includes three mobile units 6 that are somewhat independent, each straddling one row containing plants that are serviced as they are traversed. The independent mobile units 6 are affixed to a drawbar 8 so as to trail behind the tractor 2 independently passing over the individual rows of plants. As described in detail below, the mobile units 6 may accomplish various services for selected plants in each row, however, in the specific example disclosed, they thin and weed the crop by destroying excess plants between the selected plants that are spaced apart by at least a predetermined interval. Alternative services to the individual selected plants may include operations as fertilizing or the like.

In considering thinning or blocking the plants in a row as an exemplary service to be performed by an illustrative embodiment of the present invention, reference will now be made to FIG. 2. As indicated above, various crops, including sugar beets are frequently planted in closely spaced relationship as shown in the row 10. Thereafter when the plants reach a predetermined stage of growth, they are thinned by the selective removal of certain plants to leave the selected plants 12 adequate space in which to properly mature. The economy of this technique is based on the uncertainty of seed germination. That is, if seeds are planted only where a plant is desired, many of the seeds may fail to germinate with the result that large spaces in a field are unproductive resulting in a crop of low average yield.

Considering the individual mobile units 6 in greater detail, they are carried on a rigid frame that incorporate sideplates, which may be flexible and serves to shield the units. Of course, various numbers of units 6 can be incorporated for use with a single tractor, depending upon design considerations and the like; also if desired, the units can incorporate individual running gear rather than being carried by the tractor 2.

The interior operating components of a unit 6 as shown in FIG. 2, include the actual plant destruction device comprising a rotary cutting apparatus 14 carried on a horizontal shaft 16. The cutting apparatus has individual radially extending legs 18 that cut into the row 10 that destroying plants as the row is traversed or scanned. Upon reaching a plant that is to be saved, a pair of armatures 20 (FIG. 2A) which are connected to the cutting apparatus 14, are actuated by solenoid coils 22 to advance or jump the cutting apparatus 14 (forwardly along the longitudinal axis of the shaft 16) so as to skip a selected plant. A coil spring 23 restores the cutting apparatus 14 to an extended position upon termination of the electrical signal at the solenoids 22. After the selected plant has been passed by the mobile unit, the rods 20 are slowly released by an internal solenoid plunger to return the cutting apparatus preparatory to another skip advance. The solenoids 22 are mounted in diametrically opposed (balanced) locations on a housing 25 which is fixed to the supporting frame and rotatingly supports the shaft 16 to which the cutting apparatus is attached. In an alternative structure, the cutting apparatus may be formed as shown; however, with the legs 18 made of resiliently deformable material, e.g. rubberlike material. The solenoids are then replaced by a single actuator to place an obstruction in the path of the legs 18 to cause a deflection that will skip a selected plant.

The horizontal rotary shaft 16 upon which the apparatus 14 is carried is supported in bearings 24. The shaft includes a section 32 which extends forward to a universal joint 28 that is inturn coupled to a bevel gear drive 30. The bevel gear drive 30 couples the shaft section 32 to a transverse shaft 34 which is motivated by a chain drive 36 from a transverse sprocket 38 which may be variously coupled to the drive shaft of the tractor as through a bevel gear drive 39 and a universal joint 41. As a result of the connection to the tractor drive shaft, the rate of rotation of the sprocket 38 and therefore the rate of rotation of the shaft 16 is directly related to the forward speed of the mobile unit 6.

The rate of rotation of the shaft 16 is sensed to synchronize the system. Specifically, there is mounted on the shaft 16, an indicator wheel 40 (synchronized to the cutting apparatus 14) which is continually sensed by a transducer 42. These elements may take a variety of forms; for example, the wheel 40 may comprise a disc with uniformly spaced magnetic variations about its periphery and the transducer 42 may then comprise a magnetic sensing head so that the output from the transducer 42 is a series of electrical impulses the frequency of which is directly related to the rate of rotation of the shaft 16 and also to the speed of the mobile unit 6. The impulse signal from the transducer 42 is applied to a control unit, which along with the power supply is carried in a housing 44 affixed at the top of the mobile frame 46. The control unit and signal processing circuit within the housing 44 also receives electrical signals from sensors 48 (rear) and 50 (forward) which may comprise photo-optical structures as described below to provide electrical signals that may be processed to identify the presence of a plant of the row crop. Therefore, as the mobile unit 6 moves along through a field, after a predetermined space has been cleared, the sensor 50 scans the row 10 of plants and provides a signal that identifies a desired plant that is to be saved. The signal indicating the presence of the desired plant is then utilized by the control system within the housing 44 to provide a signal that jumps the destructive rotation apparatus 14 ahead of the desired plant while none of the legs 18 are in a cutting position. Thereafter, the apparatus 14 resumes its destructive operation, is slowly released to its rearward position, then at the next select time, the cycle is repeated. As the operation progresses, the sensor 48 senses the selected plants 12 which have been preserved and supplies an indicative electrical signal to the control system within the housing 44 which may function to vary the minimal space provided between plants so as to preserve more plants. For example, in rows where the plants are sparse, more would be skipped than would otherwise be left.

Structurally, the mobile frame 46 includes a main beam 52 perpendicularly extending rearward from a drawbar 8 and rigidly fixed coupled thereto. Depending from the main beam 52 are a pair of angularly set flanged shield plates 56 which dwell on either side of the row 10. Of course, various other arrangements as wheels and the like may be employed. The runners are swept back by a forward taper 57 which acts as a leading edge guide or bumper.

Recapitulating, the structure as represented in FIG. 2 is mechanically controlled so that as it is drawn forward, the plants between spaced-apart selected plants are totally destroyed, leaving the spaced-apart plants separated by at least a predetermined minimal distance. The control signals for the operation are provided from a transducer 42 (delivering clock pulses of a frequency indicative of the forward speed of the mobile unit) and signals from the sensors 48 and 50 (indicative of the substance thereunder). The signals from the sensors 48 and 50 are further refined as disclosed below to provide signals indicative of the plants 12. However, preliminary to such explanation, the system utilizing these signals to control the destructive operation will be considered in detail with reference to FIG. 3.

As shown in FIG. 3, the clock pulses indicative of the mobile units speed are applied to a terminal 60. Signals from the sensor 50 are refined as disclosed below to provide discrete pulses that indicate the presence of a select plant 12 under the sensor 50. Those pulses are applied to a terminal 62 while similar pulses indicative of a plant 12 under the sensor 48 are applied to a terminal 64. The speed-indicating clock pulses at the terminal 60 are applied to a counter 66 which establishes the minimum distance between the plants that are preserved in the row. An output pulse is derived from the counter 66 upon accomplishing such a minimum distance and that pulse is applied through a stepping relay 67 and a conductor 68 to a multivibrator 70 which may take any of a variety of forms of two-state devices as well known in the prior art that may be set in either state to provide a representative high- or low-output signal to an output conductor 72. The multivibrator 70 is set to provide an high-output signal in the conductor 72 at a time when the minimum spacing between the pair of plants has been accomplished and that output is applied to a coincidence or so-called "and" gate 74, various forms of which are well known in the prior art to provide a high-output signal to a conductor 76 upon the coincident occurrence of all input signals thereto being in a high state.

The other input signal controlling the gate 74 is from the terminal 62 and when high (to qualify the gate) indicates the presence of a desired plant under the precut sensor 50. Therefore, after the predetermined space has been cleared, the situation occurs when a desired plant is sensed and at that time, the gate 74 is qualified to set a multivibrator 78. The function of the system at this stage is to provide a slight delay to accommodate space between the plant-sensing apparatus and the actual destruction apparatus.

The output of the multivibrator 78 is applied through a conductor 80 to a coincidence gate 82 which also receives the clock pulses from the terminal 60. Therefore, after the multivibrator 78 is qualified, a relatively small number of clock pulses are applied through the gate 82 to a counter 84 pending the time when the space relationship of the plant to be saved is adjacent the actual destruction mechanism.

At that time, the counter 84 overflows and a pulse is passed from the counter 84 to the stop-cut or jump solenoids 86 (solenoids 22 in FIG. 2A) to halt the destructive operation. Thus, a minimum predetermined space is provided between independent plants which are saved for maturity.

In the event that the system is operating on a row in which the plants are sparse, it may be desirable to reduce the predetermined spacing based on the premise that some irregularity between plants is preferable to exceedingly long spaces between plants. This provision is accomplished by the system as shown in FIG. 3 by developing a signal from the sensor 48 (FIG. 2) indicative of the plants actually left in the row. Such a signal is applied through the terminal 64 (FIG. 3) to a counter 88 which controls a multivibrator 90 the outputs of which are applied to coincidence gates 92 and 94, which are in turn connected respectively to a pair of stepping coils 96 and 98 in the relay 67, to adjust the operation of the counter 66.

In view of the above preliminary description of the system of FIG. 3, a complete understanding thereof may now best be accomplished by assuming certain initial conditions and pursuing the sequence of operation as related to various situations. Therefore, assume the desire to provide a spacing between plants which is equatable to 130 clock pulses as manifest at the terminal 60. To accomplish such spacing, a movable contact 100 (lower left) is placed in engagement with a stationary contact 102 which is connected to the 130th stage of the counter 88. Several other final stages of the counter 88 are connected to provide a signal (when active) to other stationary contacts 104 which may be engaged with the movable contact 100 depending upon the minimum desired spacing between plants. Having thus established the spacing at 130 counts, the system is started so that clock pulses are provided at the terminal 60, each indicative of a predetermined distance traveled by the mobile unit along a row. Pulses also appear at the terminal 62 indicative of plants of the desired type (which have not been blocked or thinned) and pulses appear at the terminal 64 indicative of the desired plants which have been left to reach maturity.

The clock pulses applied to the counter 66 (upper left) advance that counter until the 130th stage is active, to deliver a signal to a movable contact 108 indicating the counter has reached some predetermined count, say 129 pulses. Thereupon, a currently established distance has been covered and the pulse applied to the contact 108 is transferred through the conductor 68 to the multivibrator 70 setting it to provide a high signal in the conductor 72 and thereby qualifying the gate 74.

With the qualification of the gate 74, the system in scanning the row begins searching for a selected plant of the desired row crop, occurrence of which will produce a pulse at the terminal 62 that passes through the gate 74, and the conductor 76 to set the multivibrator 78. At the instance when the multivibrator 78 is set, a plant that is to be saved is under the forward sensing device. However, it is necessary to provide some further travel to accomplish destruction of the plants lying between the sensing device and the cutter. Therefore, upon qualification of the multivibrator 78, the gate 82 is qualified to pass the clock pulses to a counter 84 which may count, for example, to only 4 or 5 counts providing a delay until the cutter is immediately adjacent the plant desired to be saved. Thereupon, the counter 84 provides an overflow pulse to the stop-cut solenoids 86 which jump the cutting or plant-destroying mechanism. It is to be noted, that the pulse from the counter 84 also is applied to reset the counter 84 as well as the multivibrator 78 and the counter 66. Also regarding reset, it is to be noted that the pulse from the gate 74 is applied through a conductor 110 to reset the multivibrator 70.

It may therefore be seen that the system accomplishes the desired thinning operation, leaving plants to reach maturity which are spaced apart by the equivalent of some 130 clock pulses as related to distance. However, for purposes of illustration, assume that an area of sparse growth is reached and the space between plants reaches a distance in excess of 130 pulses. As indicated, upon each sensing of a remaining plant after the thinning operation, a pulse is applied to the terminal 64 to reset the counter 88. After such an operation, the clock pulses 60 are applied to the counter causing it to advance until another remaining selected plant is reached. Therefore, the counter 88 attains a count indicative of the space between the plants. If the spacing attains or exceeds 130 units, as assumed, the count will create a high output on the terminal 102 thereby causing a high signal to be applied to the multivibrator 90 setting the "left" side high. The multivibrator 90 in such a state provides a high signal to a conductor 112 which qualifies the gate 92 for passage of the next pulse from the terminal 64 which is applied to the relay coil 96 to step the movable contact 108 to a lower stage contact of the counter 66. As a result, the predetermined minimum space between plants is lowered by one unit. Simultaneously, the pulse from the terminal 64 is applied to the multivibrator 90 to set the "right" side of the multivibrator high, producing a high signal in the output conductor 114.

If the converse of the assumed situation occurs, in that the counter 88 does not tally distance units to the desired number, the multivibrator 90 qualifies the gate 94 through the conductor 114 which results in the stepping operation by the relay coil 98 to advance the movable contact 108 to a higher stage contact from the counter 66. Thus, the system incorporates a form of self-checking or feedback to assure that the spacing between the remaining plants is as desired. This feature is particularly useful in thinning or blocking row crops where sections of reduced yield are encountered.

Throughout the above discussion, the structure for providing pulses indicative of plants desired to be preserved or serviced has been somewhat assumed. The details of such structures will now be considered; however, preliminarily, some consideration is desirable of the light-reflecting characteristics of various plants. In this regard, for purposes of illustration, FIG. 4 shows a somewhat idealized curve 120 which is representative of reflected light from a sugar beet leaf emanating as a result of illumination with a broad band beam of substantially uniform intensity light. The plot of reflected intensity versus light frequency develops a double-peak curve which is characteristic of sugar beet leaves. Of course, depending upon various conditions this somewhat idealized curve may vary substantially; however, variations will also occur in the curves of unidentified plants (as weeds). As shown by a dashed line in FIG. 4, a curve 122 represents a weed which provides a characteristic that is quite close to the curve 120 of a sugar beet. However, it is readily apparent that differences between the curves clearly exist and further that these differences between the curves clearly exist and further that these differences can be detected by various instrumentation apparatus. For example, it is to be noted that the amplitude of the curve 120 at the space 124 in relation to the amplitude of the space 126 represents a substantial difference between the two curves. It has been found that by utilizing these distinctions, sugar beets may be readily recognized to provide an indentification pulse, while weeds, earth, rocks and similar sources of reflected light are distinguished. Reference will now be made to FIG. 5 for consideration of an implementation having such capability. Of course, the plant identification apparatus may vary from a rather simple system as illustrated in FIG. 5 to rather complex systems as illustrated in FIG. 6, and considered below, depending upon required selectivity and the plants being identified.

As shown in FIG. 5, a source of white light which may take the form of an incandescent bulb 130 illuminates crops in a row including a leaf 132. Light reflected from the leaf 132 is then passed through windows 134 and 136 in an opaque spinning disc 140 to be focused by lenses 142 and 144 upon photosensitive structures 146 and 148 which may take a shielded form as described and shown on page 925 of Encyclopedia Dictionary of Electronics and Nuclear Engineering, published in 1959 by Prentice Hall, Inc. The photosensitive device 146 is sensitive to infrared light while the photosensitive device 148 is sensitive to visible light. The output of the photosensitive device 146 is applied to a low-pass amplifier 150 the output of which is coupled to an automatic volume control circuit 152 controlled by the output from the photosensitive device 148. That is, the volume control 152 may comprise an amplifier as disclosed at page 58 of a book entitled Design Manual for Transistor Circuits, published in 1961 by McGraw-Hill Book Company, Inc. The output from the device 148 provides a bias to stabilize the output from the amplifier 150 with variations in visible light. As a result of the relatively high infrared reflecting capability of the leaf 132, the plant to be selected provides a relatively high output from the automatic volume control circuit 152 through a conductor 154 to a threshold circuit 156 which may take the form, for example, of a well-known Schmidt trigger circuit. Upon the signal in the conductor 154 exceeding the threshold of the circuit 156, a pulse is applied to a power amplifier 158 having an output to a conductor 160. That output constitutes the signal of recognition for the leaf 132. Of course, the signal will drop back to a low value when a lower signal is applied to the threshold circuit 156. Thus, a pulse output is provided to the conductor 160 which is indicative of recognized leaves.

Considering a more sophisticated version of structure for providing pulses representing a select plant, reference will now be made to FIG. 6. A broadband light source 170 may comprise any of a wide variety of structures as well known in the prior art for providing a light beam 172 to pass through a first filter disc 174 which is mounted to comprise a rotary structure along with a circular reflector 176, a disc 178 and a window disc 180, all coaxially mounted on an axle 182. The light beam 172 passes through an annular filter window 184 (FIG. 6a) then impinges on a tapered peripheral reflecting surface 186 of the disc 176. The light beam is thus reflected within a shield or hood 188 to strike the leaf 190. Reflected light from the leaf 190, shown as a beam 191 strikes a reflecting surface 192 (opposed to surface 186) on the disc 176 to be transmitted through an annular filter window 194 (FIG. 6b, then through windows in the opaque disc 180 to strike a beam splitter 198. Upon the light beam 191 striking the splitter 198 it is divided therein between a photosensitive device 199 and a photosensitive device 200. The photosensitive device 199 is coupled through a time delay circuit 202 to an operational amplifier 204 which is directly connected to receive the output of the photosensitive device 200. The output of the operational amplifier 204 is connected to a coincidence gate 206 which is qualified by the output from a photosensitive device 210 sensing the presence of a window 214 in the disc 180 (FIG. 6c ) to time the operation. Upon qualification of the gate 206 the output from the operational amplifier 204 is applied to a threshold circuit 212 the output of which manifests the presence of the desired plant to be selected appearing as the leaf 190.

Considering the operation of the system of FIG. 6 in greater detail, the light applied through the filter 184 to the leaf 190 scans a band of the spectrum. As that light is reflected, it forms a characteristic curve somewhat as shown in FIG. 4. Therefore, by selecting certain segments of the curve comparisons can be performed which will somewhat positively identify a particular form of plant. The reflected light energy is refiltered by the filter 194 in the disc 178 and then applied to the photoelectric devices 199 and 200. If, for example, the portions of the spectrum indicated by the spaces of numerals 124 and 126 as shown in FIG. 4 to be considered, some time delay would be required. Therefore, that portion of the curve indicated by the numeral 124 would be applied through the time delay circuit 202 to the operational amplifier 204 while that portion of the characteristic curve indicated by the numeral 126 would be applied directly so that in the final analysis the operational amplifier 204 would receive signals indicative of both portions of the characteristic curve simultaneously. It is noteworthy that the filtering operations of the annular windows 184 and 194 could perhaps be accomplished, by the reflective surfaces 186 and 192.

The selectivity of the two portions of the curve is accomplished by the gating operation performed by the disc 180 containing at least one window 214, whereby two portions of the characteristic curve can be selected from the curve in isolated form, applied to the operational amplifier for time adjustment and arithmetic combination to accomplish a distinctive peak signal. For example, if the portion of the curve indicated by the numeral 126 is subtracted from the portion of the curve indicated by the numeral 124 by the operational amplifier, a substantial peak appears from the operational amplifier which will trigger the threshold circuit 212 to provide an output pulse indicative of the identified plant.

It is also to be noted that by employing the criterion set forth in the structure represented in FIG. 6, selected portions of the spectrum may be observed, and compared to distinctively identify various row crop plants. Such a structure incorporated as the sensors of the apparatus as disclosed herein therefore specifically identifies the desired crop plant for servicing.

An important feature of the present invention resides in the consideration that the system identifies the desired plants somewhat positively in association with servicing such plants. Of course, various other features and important advantages of the system as well as the objects set forth above will be apparent to those skilled in the arts with which the system is involved. Furthermore, variations in the system will become readily apparent to such persons; therefore, the scope hereof is not to be defined in accordance with the illustrative embodiment disclosed herein but rather in accordance with the appended claims.

I claim:

1. An agricultural apparatus for thinning plants in row crops, comprising:
   a mobile frame means for moving along said row crops to travel over individual plants;
   destruction means affixed to said mobile frame means, for destroying plants in a row traveled by said mobile frame means;
   distance-indicating means affixed to said mobile frame and setable to provide a command signal upon the occurrence of said mobile frame travelling a predetermined distance along said row;
   plant-sensing means affixed to said mobile frame to sense plants in said row to providing plant signals as said plants are encountered by said mobile frame;
   inhibit means affixed to said mobile frame for inhibiting the destructive operation of said destruction means for a short interval of said row;
   means affixed to said mobile frame and connected to receive said plant signals and said command signals for controlling said inhibit means to leave a plant undestroyed on the concurrence of said plant signals and said command signal;
   space-indicating means affixed to said mobile frame for metering the distance between plants in said row traveled by said mobile frame and left undestroyed by said destruction means; and
   means controlled by said space indicating means for varying said predetermined distance of said distance-indicating means inversely as said distance metered between plants in a row traveled by said mobile frame and left undestroyed.

2. An apparatus according to claim 1 wherein said plant-sensing means includes: means for illuminating said plants; means for sensing light reflected from said plants to provide two signals representative of reflected light of different band widths; and means for combining said two signals to provide said plant signals indicative of the presence of plants.

3. An apparatus according to claim 1 wherein said destruction means comprises a rotary cutting apparatus affixed to said frame means to revolve about an axis that is substantially parallel to said row crops; and wherein said inhibit means comprises means for forwardly shifting said cutting apparatus axially.